United States Patent [19]

Okada et al.

[11] Patent Number: 5,676,918
[45] Date of Patent: *Oct. 14, 1997

[54] METHOD OF PRODUCING SILICON CARBIDE FIBERS

[75] Inventors: Kaoru Okada, Kashiwa; Keihachiro Nakajima, Yokohama, both of Japan

[73] Assignee: Oji Paper Co., Ltd., Tokyo, Japan

[*] Notice: The term of this patent shall not extend beyond the expiration date of Pat. No. 5,618,510.

[21] Appl. No.: 745,206

[22] Filed: Nov. 8, 1996

Related U.S. Application Data

[63] Continuation-in-part of Ser. No. 424,626, Apr. 19, 1995, abandoned, which is a continuation of Ser. No. 170,687, Dec. 21, 1993, abandoned.

[30] Foreign Application Priority Data

Dec. 25, 1992 [JP] Japan .................... 4-347064
Jun. 21, 1993 [JP] Japan .................... 5-148804
Jun. 28, 1993 [JP] Japan .................... 5-156440

[51] Int. Cl.$^6$ .................................. C01B 31/36
[52] U.S. Cl. ............... 423/346; 423/345; 423/440; 423/460; 501/88; 501/95; 502/178
[58] Field of Search ................. 423/346, 345, 423/440, 460; 501/88, 95; 502/178

[56] References Cited

U.S. PATENT DOCUMENTS 4,914,070  4/1990  Ledoux et al. ................... 502/178
4,915,924  4/1990  Nadkarni et al. ................ 423/345
4,921,686  5/1990  Yoshida et al. ................. 423/447.6
5,427,761  6/1995  Grindatto et al. ............... 423/440

*Primary Examiner*—Deborah Jones
*Assistant Examiner*—Amy M. Harding
*Attorney, Agent, or Firm*—Armstrong, Westerman, Hattori, McLeland & Naughton

[57] ABSTRACT

Silicon carbide fibers having a high mechanical strength at a high temperature, an excellent heat resistance and a uniform structure are produced by activating carbon fibers which have been produced by heat-treating organic carbon fibers such as cellulose, polyacrylonitrile or petroleum pitch, polyimide or phenol resin fibers in an oxidative gas atmosphere and carbonizing the heat-treating organic fibers in an inert gas, with an activating gas, for example, water vapor, to convert them to the activated porous carbon fibers having a specific surface area of 100 to 3,000 m$^2$/g, a length of 5 mm or more and a thickness of 5 to 100 μm; reacting the activated porous carbon fibers with a silicon monoxide gas at a temperature of 800° C. to 2,000° C. under a reduced pressure of 10$^2$ Pa or less to convert them to silicon carbide fibers having a length of 5 mm or more, without generating whiskers; and optionally the resultant silicon carbide fibers are heat-treated at a temperature of 800° C. to 2,000° C. in the presence of an oxidative gas.

9 Claims, No Drawings

METHOD OF PRODUCING SILICON CARBIDE FIBERS

CROSS REFERENCE TO RELATED APPLICATIONS

This application is a continuation-in-past application of application Ser. No. 08/424,626 filed on Apr. 19, 1995, now abandoned, which is a continuation of application Ser. No. 08/170,687, filed on Dec. 21, 1993 now abandoned.

BACKGROUND OF THE INVENTION

1. Field of the Invention

The present invention relates to a method of producing silicon carbide fibers having a length of 5 mm or more. More particularly, the present invention relates to a method of producing silicon carbide fibers having a length of 5 mm or more, which are useful as reinforcing fibers for composite materials and as heat-insulating materials, without generating whiskers.

2. Description of the Related Art

It is known to produce silicon carbide fibers by converting a precursor consisting of an organic silicon compound or by coating carbon fibers or tungsten fibers having a diameter of several μm with silicon carbide by using a chemical vapor deposition (CVD) or vapor depositing method.

In the conventional precursor-converting method, as disclosed in, for example, Japanese Examined Patent Publication (Kokoku) No. 59-33,681, a polydimethyl silane is synthesized from dimethyldichlorosilane in the presence of metallic sodium by a dechlorination reaction, and then converted to a polycarbosilane by a thermal decomposition reaction. The resultant polycarbosilane is melt-spun, the resultant polycarbosilane filaments are heat-treated at a temperature of from 100° C. to 190° C. in air to thermally oxidize the filaments and to make the filaments non-fusible, and then the resultant oxidized filaments are sintered at a temperature of from 1,200° C. to 1,500° C. in an inert gas stream.

The silicon carbide fibers produced by the above-mentioned method are advantageous in that they have an excellent mechanical strength and a high heat resistance. Nevertheless, the fibers are disadvantageous in that they are difficult to bend quickly due to a high modulus thereof and to be woven into a fabric due to a high resistance thereof to plastic deformation. Also, when the silicon carbide fibers are cut into staple fibers and then processed into a sheet form, for example, a felt, it is impossible to form the sheet without using a binder because the silicon carbide fibers have a high rigidity and thus a very poor capability of interlacing with each other. The binder consists of an organic substance and this exhibits a relatively poor heat resistance. Accordingly, when the silicon carbide fiber fabric is made by using the binder, the resultant fabric exhibits, as a whole, a relatively poor heat resistance, and thus the high heat resistance of the silicon carbide fibers cannot be utilized.

When the above-mentioned method is used, it was expected to be able to form a fabric from the precursor fibers and that the precursor fiber fabric could be sintered to produce a silicon carbide fiber fabric. However, this expectation cannot be attained because the precursor polycarbosilane fibers have a very poor mechanical strength and thus exhibit a very poor processability. Therefore, it is practically impossible to produce a sheet from the polycarbosilane fibers.

In the conventional vapor depositing method, as disclosed in, for example, Japanese Unexamined Patent Publication (Kokai) No. 60-231,820, carbon fibers are heat-reacted with a silicon monoxide (SiO) gas. This conventional method, however, is disadvantageous in that only the surface portions of the carbon fibers can be converted to silicon carbide and the inner portions of the carbon fibers substantially cannot be completely converted to silicon carbide.

In a conventional method of producing silicon carbide fibers by using a CVD method, it is known to coat silicon carbide on the surfaces of carbon fibers or tungsten fibers by using silicon tetrachloride as a silicon-supply source. The silicon carbide fibers produced by this method are disadvantageous in that the resultant fibers have a large diameter and a high elastic modulus and thus are difficult to weave into a woven fabric. Also, the difficulty with the staple fibers in the formation of a sheet is similar to that when the silicon carbide fibers produced by the precursor method are used. Further, when the continuous silicon carbide filaments produced by the CVD method are cut into staple fibers so as to form cut surfaces of the staple fibers, the core portions of the cut surface consisting of carbon and tungsten are exposed to the outside. Accordingly, the resultant staple fibers exhibit, as a whole, a reduced resistance to oxidation, and thus the sheet formed from the staple fibers also exhibits an unsatisfactory resistance to oxidation.

As a silicon carbide fiber material capable of being processed into a sheet form, whisker fibers are known. The method of producing the whisker fibers is disclosed in Japanese Examined Patent Publication (Kokoku) No. 49-32,719. The whisker fibers have a small thickness of 0.05 μm to several μm and a length of 50 μm at the longest. The whisker fibers are fibrous crystals and are rigid and thus cannot be processed into a sheet if no binder is employed. Also, since whisker fibers are very thin and short, it is difficult to form a bulky sheet having a high mechanical strength from the whisker fibers.

As mentioned above, the silicon carbide fibers or filaments produced by the conventional methods are difficult to form into a silicon carbide fiber sheet having a high mechanical strength if no binder is employed. Also, it is difficult to produce a woven fabric having a high weaving density from continuous silicon carbide filaments.

SUMMARY OF THE INVENTION

An object of the present invention is to provide a method of producing silicon carbide fibers having a high mechanical strength even at a high temperature and an excellent heat resistance.

Another object of the present invention is to provide a method of producing silicon carbide fibers consisting of silicon carbide not only in the surface portions but also in the core portions thereof and having a dense structure.

Still another object of the present invention is to provide a method of producing silicon carbide fibers having a high resistance to oxidation even in an oxidative atmosphere at a high temperature, and thus being resistant to formation of hollow spaces in the core portions, and to reduction in weight and mechanical strength.

A further object of the present invention is to provide a method of producing silicon carbide fibers capable of being formed into a sheet form even if no binder is employed.

The above-mentioned objects can be attained by the method of the present invention for producing silicon carbide fibers comprising the steps of:

producing activated porous carbon fibers by heat-treating organic fibers selected from the group consisting of cellulose fibers, polyacrylonitrile fiber, petroleum pitch fibers, polyimide fibers and phenol resin fibers, in an oxidative gas atmosphere, carbonizing the heat-treated organic fibers in an inert gas, and activating the resultant carbon fibers with an activating gas, to convert the carbon fibers to activated porous carbon fibers having a specific surface area of 100 to 3,000 m$^2$/g a length of 5 mm or more and a thickness of from 5 to 100 µm; and bringing the activated porous carbon fibers into contact with a silicon monoxide gas at a temperature of from 800° C. to 2,000° C. under a reduced pressure of 10$^2$ Pa or less, to allow the silicon monoxide gas to diffuse into the pores of the activated porous carbon fibers and to react with the peripheral and internal wall surfaces of the carbon fibers so as to silicify them into silicon carbide fibers having a length of 5 mm or more, without generating silicon carbide whiskers.

The method of the present invention optionally further comprises heat-treating the resultant silicon carbide fibers at a temperature of from 800° C. to 2,000° C. in a gas atmosphere containing an oxidative gas.

DESCRIPTION OF THE PREFERRED EMBODIMENTS

In the method of the present invention, activated porous carbon fibers are produced by heat-treating organic fibers selected from the group consisting of cellulose fibers, polyacrylonitrile fibers, petroleum pitch fibers, polyimide fibers and phenol resin fibers in an oxidative gas atmosphere preferably at a temperature of from 200° C. to 400° C. to convert the organic fibers to non-fusible fibers; carbonizing the heat-treated organic fibers in an inert gas preferably at a temperature of from 450° C. to 1,000° C.; and activating the resultant carbon fibers with an activating gas, for example, water vapor (steam) preferably at a temperature of from 800° C. to 1,200° C. to convert the carbon fibers into activated porous carbon fibers. The resultant activated porous carbon fibers have a specific surface area of 100 to 3,000 m$^2$/g, a length of 5 mm or more and a thickness of from 5 to 100 µm. The organic fibers to be converted to the activated porous carbon fibers are selected from those having a length and thickness sufficient to cause the resultant activated porous carbon fibers to have a length of 5 mm or more and a thickness of 5 to 10 µm. The organic carbon fibers may be in the form of staple fibers or continuous filaments.

The activated porous carbon fibers have a large number of fine pores distributed uniformly in the fibers and, having a size of from 0.5 nm to 20 nm, exhibit a specific surface area of from 100 to 3,000 m$^2$/g, more preferably from 100 to 2,500 m$^2$/g. Also, the carbon fibers usable for the present invention preferably have a thickness of 5 to 100 µm.

If the specific surface area is less than 100 m$^2$/g, it is sometimes difficult to completely convert the core portions of the carbon fibers to silicon carbide, and thus in the resultant fibers, sometimes only the surface portions comprise silicon carbide. Also, if the specific surface area is more than 3,000 m$^2$/g, the resultant silicon carbide fibers sometimes exhibit a poor mechanical strength and are difficult to handle. The activated porous carbon fibers may be staple fibers 5 mm or more long or may be continuous filaments.

If the activated porous carbon fibers have a length of less than 5 mm and/or a thickness of less than 5 µm, the resultant silicon carbide fibers are difficult to handle and to form into a desired article, for example, a sheet usable for producing a desired reinforcing material, for example, a reinforcing sheet. Also, if the activated porous carbon fibers have a thickness of more than 100 µm, the resultant silicon carbide fibers have an unsatisfactory flexibility and are difficult to fabricate into a desired article, for example, a sheet, usable for producing a desired reinforcing material, for example, a reinforcing sheet.

Further, to obtain silicon carbide fibers having a high mechanical strength, it is preferable that the activated porous carbon fibers be in a straight form, have a smooth surface free from defects and more preferably a core portion free from defects.

Particularly, to produce silicon carbide fibers having a dense structure even in the core portions thereof and a high mechanical strength, it is preferable that the activated porous carbon fibers have a diameter of 5 to 20 µm and a specific surface area of 400 to 2,000 m$^2$/g.

In the method of the present invention, the activated porous carbon fibers are brought into contact with a silicon monoxide (SiO) gas at a temperature of from 800° C. to 2,000° C., preferably from 800° C. to 1,700° C., under a reduced pressure of 10$^2$ Pa or less, preferably 10 to 10$^{-2}$ Pa. During this step, the silicon monoxide gas is allowed to diffuse into the pores of the activated porous carbon fibers and to react with the peripheral surfaces and inside wall surfaces of the pores of the activated porous carbon fibers, and thus the activated porous carbon fibers are completely silicified into silicon carbide fibers which have a length of 5 mm or more, and are in the same form as that of the activated porous silicon carbide fibers, without generating silicon carbide whiskers.

The supply source of the silicon monoxide gas usable for the present invention is not specifically limited. Preferably, a silicon monoxide gas generated by heating grains or particles of silicon monoxide or silicon dioxide or a mixture of fine silicon particles and fine silicon monoxide particles or a mixture of fine silicon particles and fine silicon dioxide particles at a temperature of 500° C. or more under a reduced pressure of from 10$^{-6}$ to 10$^3$ Pa, is preferably used for the method of the present invention.

The generation of the silicon monoxide gas is preferably carried out in a vertical type or horizontal type heating furnace which is provided with an internal heating means, an external heating means or an induction heater, and is capable of firing the materials under a reduced pressure or in a gas atmosphere or stream. The heating furnace is preferably a tube type or box type furnace made from a refractory material, for example, alumina, magnesia, zirconia, mullite or carbon.

In the method of the present invention, since silicon carbide is generated by passing the silicon monoxide gas into the fine pores of the porous carbon fibers and reacting the silicon monoxide gas with carbon forming the wall surfaces of the fine pores, it is preferable that the concentration of the silicon monoxide gas is as high in the reaction system as possible so as to promote the diffusion of the silicon monoxide gas into the fine pores. A preferable silicon monoxide gas concentration is 10$^{-3}$ to 10$^2$ Pa in terms of pressure. More preferably, the pressure in the heating furnace is 10 Pa or less, and the temperature in the heating furnace is controlled to from 800° C. to 1,700° C., still more preferably from 1,000° C. to 1,400° C.

To cause the silicon monoxide gas diffused into the fine pores to react with carbon in the inside surface portion of the porous carbon fiber, it is necessary to externally impart energy to the reaction system. Accordingly, to produce silicon carbide, it is necessary to heat the porous carbon fibers and the silicon monoxide gas located within the fine pores in the porous carbon fibers after the silicon monoxide gas diffuses into the fine pores. The heating is preferably carried out in a tube-shaped or box-shaped vertical or horizontal type heating furnace having an internal or external heating means or an induction heating means made from a refractory material, for example, alumina, magnesia, zirconia, mullite or carbon, and capable of firing the materials at a temperature of 800° C. to 2,000° C. under a reduced pressure of $10^2$ Pa or less. The silicon monoxide gas may be mixed with an inert gas, for example, argon gas or nitrogen gas.

If the reaction temperature is lower than 800° C., the reaction of the porous carbon fibers with the silicon monoxide gas is not completed and core portions of the porous carbon fibers remain non-converted to silicon carbide. When the heating temperature is higher than 2,000° C., the resultant fine particles of silicon carbide grow and thus the resultant silicon carbide fibers exhibit a reduced mechanical strength and are easily broken.

To completely convert the activated porous carbon fibers to relatively dense silicon carbide fibers even in the core portions thereof, it is preferable that the reaction temperature be controlled to a level of from 1,000° C. to 1,400° C.

If the reaction pressure is more than $10^2$ Pa, undesirable whiskers are generated around the activated porous carbon fibers and thus, the complete conversion of the activated porous carbon fibers to the corresponding form of the silicon carbon fibers is hindered. Also, in the reaction of the activated porous carbon fibers with silicon monoxide, any catalyst, for example, an iron compound, is unnecessary. Sometimes, the presence of the catalyst undesirably promotes the generation of whiskers. The temperature-raising rate of the reaction system is not limited to a specific rate. The reaction system is, however, heated preferably at a temperature-raising rate of 50° to 1,500° C./hr. Also, the reaction temperature is preferably maintained for one minute to 20 hours, more preferably 30 minutes to 10 hours. If the reaction time is shorter than one minute, sometimes, the reaction may be not completed and thus the core portions of the carbon fibers may be not converted to silicon carbide. When the reaction time is longer than 20 hours, the resultant fine silicon carbide particles may grow excessively and the resultant silicon carbide fibers may exhibit a reduced mechanical strength and are thus easily broken.

As a method of bringing the silicon monoxide gas into contact with the activated porous carbon fibers, the silicon monoxide gas is generated from the above-mentioned silicon monoxide gas-generating material placed in the heating furnace, and is then introduced into a reaction furnace in which the activated porous carbon fibers are placed so as to cause the reaction of the porous carbon fibers with the silicon monoxide gas. In another method, the silicon monoxide gas-generating material and the porous carbon fibers are introduced into a reaction furnace and heated at the reaction temperature so as to simultaneously cause the generation of the silicon monoxide gas and the reaction of the activated porous carbon fibers therewith.

In the latter method in which the activated porous carbon fibers are placed together with the silicon monoxide gas-generating material in one and the same furnace, to make the concentration of silicon monoxide gas in the atmosphere surrounding the porous carbon fibers high, the silicon monoxide gas-generating material is preferably in the form of particles or granules and is present in an excessive amount of 2 to 30 times the weight of the activated porous carbon fibers. Also, in the reaction furnace, the activated porous carbon fibers are placed as close as possible to the silicon monoxide gas-generating material particles or granules, and the pressure of the inside of the reaction furnace is controlled to as low as possible, preferably $10^2$ Pa or less, and the reaction system is heated at a temperature of 800° C. to 2,000° C., preferably 800° C. to 1,700° C., still more preferably 1,000° C. to 1,400° C. In this method, to maintain the contact of the activated porous carbon fibers with a high concentration of the silicon monoxide gas for a long time, the temperature-raising rate for the silicon monoxide gas generation is preferably as low as possible, for example, 50° to 1,500° C./hr, more preferably 200° to 1,000° C./hr, and the reaction time at the desired reaction temperature is preferably one minute to 20 hours, more preferably 30 minutes to 10 hours.

To produce silicon carbide fibers having a high mechanical strength, it is preferable that during the reaction of the activated porous carbon fibers with the silicon monoxide gas, the activated porous carbon fibers must be maintained in a tensed condition. For this purpose, the porous carbon fibers are preferably straightened, and the ends of the fibers are fixed by using an adhesive or connected to weights. Otherwise, an end of a continuous carbon filament is fixed to a base by an adhesive and the other end is connected to a weight, and the filaments are hung vertically.

The silicon carbide fibers produced in accordance with the method of the present invention have smooth surfaces thereof and a dense silicon carbide structure even in the core portions thereof. Accordingly, even when heat-treated at a temperature of 800° C. to 1,500° C. in an oxidative atmosphere, substantially no reduction in weight or in mechanical strength of the silicon carbide fiber occurs.

The silicon carbide fibers made by the method of the present invention may contain as a minor component, a small amount, for example, 1 to 10% based on the total weight of the fibers, of silicon dioxide and/or carbon.

In an embodiment of the method of the present invention, the silicon carbide fibers are produced by reacting activated porous carbon fibers having a specific surface area of 100 to 2,500 m²/g a length of 5 mm or more and a thickness of 10 to 100 μm, with a silicon monoxide gas at a temperature of from 800° C. to 2,000° C. under a reduced pressure of $10^2$ Pa or less; and then heat-treating the resultant silicon carbide fibers at a temperature of from 800° C. to 2,000° C. in a gas atmosphere containing an oxidative gas.

The heat treatment is contributorily applied to the silicon carbide fibers to enhance the mechanical strength thereof. The heat treatment is carried out at a temperature of 800° C. to 2,000° C., preferably 1,000° C. to 1,400° C. If the heat treatment temperature is lower than 800° C., the resulting mechanical strength-enhancing effect may be unsatisfactory. Also, if the heat treatment temperature is higher than 2,000° C., the constitutional components of the fibers may be thermally decomposed or undesirably crystallized and thus this phenomenon causes the mechanical strength of the fibers to be reduced.

The heat treatment atmosphere is not limited to a specific type of atmosphere. Usually, the heat treatment atmospheres include gas atmospheres and streams containing at least 1 ppm of an oxygen gas or an oxygen-generating compound gas which generates molecular oxygen at a high temperature, mixed into an inert gas, for example, an argon or nitrogen gas. The heat treatment may be effected in air. In another embodiment, the heat treatment gas atmosphere consists of oxygen gas alone in an amount, in terms of pressure, of $10^{-3}$ Pa or more.

The heat treatment time is usually in the range of from one second to 10 hours, preferably one minute to 60 minutes. When the heat treatment time is excessively short, heat is unsatisfactorily transmitted to the silicon carbide fibers, so the temperature of the fibers cannot be raised to a satisfactory level, and thus the resultant effect of the heat treatment is unsatisfactory. Also, if the heat treatment time is excessively long, not only is the producibility of the product reduced, but also, the silicon carbide particles are crystallized and the crystals grow so as to reduce the mechanical strength of the silicon carbide fibers.

The temperature-raising rate in the heat treatment is not limited to a specific level thereof. Usually, the temperature of the heat treatment system is raised at a rate of 50° to 120,000° C./hr. The heat treatment temperature raising rate is preferably as high as possible as long as the raising rate of temperature does not impart a heat impact to the heating furnace in which the heat treatment is carried out. If the temperature raising rate is excessively low, too long a time may be necessary to raise the temperature of the heat treatment system to the desired level, and thus the silicon carbide fibers may be exposed to a high temperature close to the desired heat treatment temperature for a long time. Therefore, the resultant heat treated fibers exhibit an unsatisfactory mechanical strength. In an embodiment of the heat treatment procedure, the temperature of the inside of the heat treatment furnace is established at a desired level, and then the silicon carbide fibers are introduced into the furnace and heat treated therein for a necessary time.

The heat treatment furnace may be selected from the furnaces usable for the silicon carbide fiber-producing method as mentioned above. Alternatively, an infrared ray-heating apparatus can be used for the heat treatment, in which the temperature of the silicon carbide fibers can be raised at a very high rate to the desired level. Also, the heat treatment can be effected by employing a flame applying apparatus.

The heat treatment can be applied to the silicon carbide fibers without applying a tension thereto. Preferably, the heat treatment is carried out while the silicon carbide fibers are tensed by using a suitable tensing tool or weights.

In another embodiment of the method of the present invention, the activated porous carbon fibers or filaments are in the form of a sheet, for example, woven fabric, knitted fabric, nonwoven fabric or felt, then the resultant porous carbon fiber (filament) sheet is reacted with a silicon monoxide gas at a temperature of 800° C. to 2,000° C. under a reduced pressure of $10^2$ Pa or less. Optionally, the resultant silicon carbide fiber (filament) sheet is heat treated at a temperature of 800° C. to 2,000° C. in a gas atmosphere containing an oxidative gas.

The porous carbon fiber sheet can be provided by forming organic fibers (filaments) into a sheet for example, woven fabric, knitted fabric, nonwoven fabric or felt, and converting the organic fibers (filaments) in the sheet to activated porous carbon fibers; or by providing porous carbon multifilament yarns or porous carbon fiber spun yarns, and weaving or knitting the yarns into a fabric, or by forming a nonwoven fabric from the porous carbon fibers (or filaments) by a dry sheet-forming method or wet sheet-forming method.

Preferably, the sheet contains the activated porous carbon fibers or filaments in an amount of 10% to 100%, more preferably 50 to 100%, based on the total weight of the sheet. If the content of the activated porous carbon fibers or filaments is less than 10% by weight, it becomes difficult to obtain a resultant silicon carbide fiber-containing sheet having an expected satisfactory performance.

In the production of the activated porous carbon fiber sheet, for example, a sheet containing organic fibers capable of being carbonized is heat-treated in an oxidative gas atmosphere at a temperature of 200° C. to 400° C. to make the fibers infusible, carbonized in an inert gas at 450° C. to 1,000° C. and then activated with an activating gas such as water vapor at a temperature of 800° C. to 1,200° C.

The activated porous carbon fibers in the sheet are converted to silicon carbide fibers in accordance with the method of the present invention and then, optionally, the resultant silicon carbide fibers are heat-treated in the above-mentioned manner. When the sheet contains fibers other than the silicon carbide fibers, the other fibers can be selected from inorganic fibers, for example, alumina, mullite, zirconia, glass, silicon nitride and metallic fibers.

EXAMPLES

The present invention will be further explained by way of the following specific examples, which are merely representative and do not in any way restrict the scope of the present invention.

Example 1

Activated porous carbon fibers were produced by heat-treating phenol resin fibers having a length of 700 nm and a thickness of 15 μm in air at a temperature of 200° C. for 60 minutes; carbonizing the heat-treated phenol resin fibers in an inert gas consisting of nitrogen at a temperature of 900° C. for 10 minutes; and activating the resultant carbon fibers with water vapor at a temperature of 900° C. for 10 minutes. The resultant activated porous carbon fibers had a filament thickness of 10 μm, a specific surface area of 1,500 m$^2$/g and a length of 100 mm.

A bundle consisting of the activated porous carbon fibers in an amount of 0.1 g were placed on a layer consisting of 2 g of a silicon monoxide powder having a particle size of 5 to 50 μm, and the activated porous fiber bundle was tensed and fixed on the silicon monoxide powder layer by connecting weights to the ends of the fiber bundle.

The resultant reaction system of the activated porous carbon fiber bundle with the silicon monoxide powder layer was placed in an internal heating type tube-shaped carbon furnace. The pressure in the furnace was reduced to 1 Pa, and the temperature of the reaction system was raised at a rate of 3,000° C./hr to a level of 1,000° C. and then at a rate of 200° C./hr to a level of 1,200° C. Then the reaction system temperature was maintained at the level of 1,200° C. for one hour to generate a silicon monoxide gas and to convert the activated porous carbon fibers to silicon carbide fibers in the furnace. Then the resultant reaction product was cooled at a cooling rate of 200° C./hr until it reached a temperature of 1,000° C., and then naturally cooled to room temperature. No whiskers were found in the reaction system.

The resultant fibers were subjected to an infrared absorption spectral analysis by a potassium bromide tablet method. As a result, an absorption peak due to silicon carbide was found at about 900 cm$^{-1}$. Also, the fibers were subjected to X-ray diffractometry to measure a diffraction angle of crystals in the resultant silicon carbide fibers. In the diffractometry; a gradual peak was found at about CuKα 2θ=35.7 degrees of angle. From the above-mentioned results, it was confirmed that the resultant fibers were fine crystalline silicon carbide fibers.

Further, the resultant silicon carbide fibers were heat treated at a temperature of 1,000° C. in an oxidative atmosphere for one hour. It was found that no reduction in weight occurred. From this fact, it was confirmed that the resultant silicon carbide fibers substantially did not contain carbon and consisted completely of silicon carbide even in the core portions thereof.

The bundles consisting of 100 to 300 silicon carbide fibers as mentioned above were subjected to a measurement of tensile strength thereof at a stretching rate of 2 mm/min. The measurement was repeated 10 times and an average of the tensile strength of the fibers was calculated. In the results, the silicon carbide fibers had an average tensile strength of 1,100 MPa and an average elastic modulus of 120 GPa, determined in accordance with Japanese Industrial Standard (JIS) R 7601.

Example 2

In an externally heating furnace, 5 g of fine silicon monoxide powder having a particle size of 5 to 50 μm was heated under a pressure of 10 Pa at a temperature-raising rate of 3,000° C./hr until 1,000° C. and then at a temperature-raising rate of 1,000° C./hr to a temperature of 1,500° C., to generate a silicon monoxide gas.

Separately, activated porous carbon fibers having a fiber diameter of 10 μm, a specific surface area of 1,500 m²/g and a length of 500 mm were prepared by heat-treating phenol resin fibers, carbonizing the heat-treated fibers having a diameter of 15 μm and a length of 700 mm and then activating the carbonized fibers by the same procedures as in Example 1. A bundle of the activated porous carbon fibers with a length of 100 mm in an amount of 0.5 g was placed in a tube-shaped heating furnace in such a manner that an upper end of the bundle was fixed in the furnace, and a lower end of the bundle was connected to a weight so as to tense the activated porous carbon fiber bundle in the vertical direction. The inside of the furnace was evacuated to a reduced pressure of $10^{-2}$ Pa and heated to a temperature of 1,000° C. Into the furnace, the generated silicon monoxide gas was introduced, then the temperature of the reaction system in the furnace was raised to 1,200° C. at a temperature-raising rate of 200° C./hr and then the temperature was maintained at 1,200° C. for one hour to fire the reaction system. Then, the reaction system in the furnace was cooled down to 1,000° C. at a cooling rate of 200° C./hr and then naturally cooled to room temperature. Until the reaction for producing the silicon carbide fibers in the heating furnace was completed, the fine silicon monoxide powder was continuously heated to generate the silicon monoxide gas to continuously feed the silicon monoxide gas into the heating furnace. After the reaction was completed, the remaining fine silicon monoxide powder was allowed to naturally cool. No whiskers were found in the reaction system.

The resultant silicon carbide fibers were subjected to an infrared ray absorption spectral analysis by the potassium bromide tablet method. As a result, an absorption peak derived from silicon carbide was found at about 900 cm$^{-1}$. Also, the fibers were subjected to X-ray diffractometry to measure a diffraction angle due to silicon carbide crystals in the fibers. In this measurement, a gradual peak was found at about CuKα 2θ=35.7 degrees of angle. From this fact, it was confirmed that the resultant fibers were fine crystalline silicon carbide fibers.

The silicon carbide fibers had a thickness of 10 μm and a length of 90 mm.

When the fibers were heated in an oxidative atmosphere at a temperature of 1,000° C. for one hour, a weight reduction of about 10% was found.

The bundles consisting of 100 to 300 silicon carbide fibers were subjected to a measurement of tensile strength thereof at a stretching rate of 2 mm/min. The measurement was repeated 10 times, and an average tensile strength of the fibers was calculated. It was found that the resultant silicon carbide fibers had an average tensile strength of 1,400 MPa and an average elastic modulus of 150 GPa.

Comparative Example 1

Comparative silicon carbide fibers were produced by the same procedures as in Example 1 with the following exceptions.

The activated porous carbon fibers produced from the phenol resin fibers were replaced by non-activated carbon fibers produced from the phenol resin fibers by the same heat-treating and carbonizing procedures as in Example 1.

When the resultant fibers were subjected to the infrared ray absorption spectral analysis by the potassium bromide tablet method, an absorption was found at about 900 cm$^{-1}$ and the existence of silicon carbide in the resultant fibers was confirmed. When the fibers were heated in an oxidative atmosphere at a temperature of 1,000° C. for one hour, however, a weight reduction of 95% of the fibers occurred. Further, when the fiber was observed by a scanning electron microscope, it was found that the fiber had a thin silicon carbide layer formed only on a surface portion of the fiber and the core portion of the fiber consisted of carbon. Namely, it was confirmed that the core portion of the non-activated (non-porous) carbon fiber was never converted to silicon carbide.

As the comparison of Example 1 with Comparative Example 1 clearly indicates, when the silicon monoxide gas is supplied to create a reaction with carbon fibers, the use of activated porous carbon fibers effectively enables the activated porous carbon fibers to be completely converted to dense silicon carbide fibers. However, the non-activated dense carbon fibers can react with silicon monoxide only at the peripheral surface portions thereof and the core portions remain unreacted.

Comparative Examples 2 and 3

In each of Comparative Examples 2 and 3, comparative silicon carbide fibers were produced by the same procedures as in Example 1 with the following exceptions.

The firing (reaction) temperature was 600° C. in Comparative Example 2 and 2,100° C. in Comparative Example 3.

The resultant fibers were subjected to the infrared ray absorption spectral analysis by the potassium bromide tablet method.

In Comparative Example 2 (reaction temperature: 600° C.), no absorption was found at around 900 cm$^{-1}$, and thus the existence of silicon carbide in the resultant fibers was not found.

In Comparative Example 3 (reaction temperature: 2,100° C.), an absorption peak was found at about 900 cm$^{-1}$ and thus the existence of silicon carbide in the resultant fibers was confirmed. When the resultant fibers were subjected to the X-ray diffraction analysis to measure the diffraction angle of crystals in the fibers, a sharp peak was found at about CuKα 2θ=35.7. From this fact, it was confirmed that the resultant fibers were crystalline silicone carbide fibers in which the crystals were significantly grown.

Also, the resultant fibers of Comparative Examples 2 and 3 were heated in an oxidative atmosphere at a temperature of 1,000° C. for one hour.

In Comparative Example 2, the fibers (reaction temperature: 600° C.) were completely burned and no combustion residue was found. In Comparative Example 3 (reaction temperature: 2,100° C.), no weight reduction of the fiber occurred. From this fact, it was confirmed that the fibers completely consisted of silicon carbide even in the core portions thereof.

Bundles consisting of 100 to 300 silicon carbide fibers of Comparative Example 3 were subjected to a tensile tester at a stretching rate of 2 mm/min. The tensile strength of the bundles could not be determined because the bundles were easily broken.

Example 3

Activated carbon fibers were produced by heat-treating phenol resin fibers having a thickness of 15 μm and a length of 140 mm at a temperature of 200° C. for 60 minutes in air atmosphere; carbonizing the heat treated fibers at a temperature of 900° C. for 10 minutes in an inert gas atmosphere consisting of nitrogen; and activating the resultant carbon fibers with water vapor at a temperature of 900° C. for 10 minutes, to provide activated porous carbon fibers having a fiber diameter of 10 μm, a specific surface area of 1,500 m²/g and a fiber length of 100 mm.

A bundle consisting of 0.1 g of the activated porous carbon fiber was placed on a layer consisting of 2 g of silicon monoxide particles which was available commercially, and tensed under a load of 5 g.

The combination of the tensed porous carbon fiber bundle with the silicon monoxide particles was placed in an alumina-made core tube in a tube-shaped heating furnace. The pressure of the inside of the furnace was reduced to 1 Pa, and the temperature of the furnace was raised up to 1,000° C. at a raising rate of 3,000° C./hr, then up to 1,300° C. at a raising rate of 1,200° C./hr. The furnace temperature was maintained at 1,300° C. for 2 hours to cause the activated porous carbon fibers to react with the silicon monoxide gas, and then the furnace was naturally cooled to room temperature. No whisker was found in the reaction system.

The resultant silicon carbide fibers had a thickness of 10 μm and a length of 90 mm, and a tensile strength of 1,100 MPa.

Then, the resultant fibers under tension were placed in a furnace maintained at a temperature of 1,300° C. and heat-treated in air for 15 minutes.

The resultant heat treated fibers had a tensile strength of 1,600 MPa.

For comparison, the same heat treatment as mentioned above was applied to the same silicon carbide fibers as mentioned above except that the heat treatment was carried out at a temperature of 600° C. in air in the furnace. The heat-treated comparative fibers exhibited a tensile strength of 1,100 MPa determined by JIS R 7601.

For another comparison, the same heat treatment as in Example 3 was applied to the same silicon carbide fibers as mentioned above in the furnace for 15 minutes except that an inert gas consisting of argon was passed, at a flow rate of 500 ml/min, through the furnace while maintaining the furnace temperature at a level of 1,300° C.

The resultant comparative heat treated silicon carbide fibers had a tensile strength of 900 MPa determined by JIS R 7601.

Example 4

Silicon carbide fibers were produced by the same procedures as in Example 3, with the following exceptions.

The heat treatment for the silicon carbide fibers was carried out in a furnace controlled to a temperature of 1,300° C. for 15 minutes while flowing a mixed gas consisting of 50% by volume of nitrogen and 50% by volume of oxygen through the furnace.

The resultant heat treated silicon carbide fibers had a tensile strength of 1,800 MPa determined by JIS R 7601.

Example 5

An activated porous carbon fiber felt having a basis weight of 180 g/m², a thickness of 0.7 mm, a width of 30 mm and a length of 30 mm was produced by forming phenol resin fibers a thickness of 15 μm and an average length of 50 mm into a felt having a basis weight of 670 g/m²; heat-treating the phenol resin fiber felt in air at a temperature of 2000° C. for 10 minutes; carbonizing the heat-treated felt in an inert gas atmosphere consisting of nitrogen at a temperature of 900° C. for 10 minutes; and activating the resultant carbon fiber felt with water vapor at a temperature of 900° C. for 10 minutes.

The resultant activated porous carbon fibers in the felt had a specific surface area of 1500 m²/g, a thickness of 8 μm and an average length of 35 mm.

Silicon monoxide particles in an amount of 5 g were placed on an alumina plate, and 0.16 g of the activated porous carbon fiber felt was superimposed on the silicon monoxide particle layer and then covered with an alumina covering plate. This combination was placed in a core tube having a diameter of 50 mm and made of alumina, in a tube-shaped heating furnace. The inside pressure of the furnace was reduced to 1 Pa. Then, the inside temperature of the furnace was raised up to 1,000° C. at a rate of 1,000° C./hr and then up to 1,300° C. at a rate of 300° C./hr, then maintained at the level of 1,300° C. for 2 hours to cause the activated porous carbon filaments to react with silicon monoxide gas generated from the silicon monoxide particles. The furnace was naturally cooled to room temperature at a cooling rate of 300° C./hr. No whiskers were found in the reaction system.

The resultant silicon carbide fiber felt was subjected to an infrared ray absorption spectral analysis by a potassium bromide tablet method. As a result, an absorption peak corresponding to silicon carbide was found at about 900 cm⁻¹. Also, in an X-ray diffractometry for measuring the diffraction angle of the crystals in the fibers, a peak was found at CuKα 2θ=35.7 degrees. From this result, it was confirmed that the felt consisted of crystalline silicon carbide fibers.

The silicon carbide fiber felt was heated in air at a temperature of 1,000° C. for one hour. No reduction in weight of the sheet was found.

Also, the silicon carbide fiber felt had a basis weight of 270 g/m², a thickness of 0.7 mm, a width of 30 mm and a length of 30 mm, and exhibited a tensile strength of 30 kg/30 mm.

Example 6

Silicon monoxide particles in an amount of 5 g were placed on an alumina plate, and 0.05 g of an activated porous carbon fiber felt having a basis weight of 60 g/m², a thickness of 4 mm, a width of 30 mm and a length of 30 mm was placed on the silicon monoxide particle layer and covered by a alumina covering plate. An activated porous carbon fiber felt having a basis weight of 60 g/m², a thickness of 0.7 mm, a width of 30 mm and a length of 30 mm produced by forming polyacrylonitrile fibers having a thickness of 12 μm and an average length of 50 mm into a felt having a basis weight of 300 g/m² heat-treating the polyacrylonitrile fiber felt in air at a temperature of 200° C. for 10 minutes; carbonizing the heat-treated felt in an inert gas atmosphere consisting of nitrogen at a temperature of 900° C. for 10 minutes; and activating the resultant carbon fiber felt with water vapor at a temperature of 900° C. for 10 minutes. The resultant activated porous carbon fibers in the felt had a specific surface area of 1500 m²/g, a thickness of 8 μm and an average length of 35 mm.

The combination of the alumina base plate, the silicon monoxide particle layer, the activated porous carbon fiber felt and the alumina covering plate was placed in an alumina core tube having a diameter of 50 mm in a tube-shaped heating furnace, and fired in the same manner as in Example 5. No whiskers were found in the reaction system. The resultant silicon carbide fiber felt had a basis weight of 96 g/m².

As a result of the infrared ray absorption spectral analysis and the X-ray diffractometry, it was confirmed that the fired felt consisted of silicon carbide fibers. Also, it was confirmed that a heat treatment applied to the resultant felt in air at a temperature of 1,000° C. for one hour caused no reduction in weight of the felt.

Example 7

The same silicon carbide fiber felt as in Example 5 was heat treated in air atmosphere in the heating furnace at a temperature of 1,300° C. for 15 minutes. The resultant heat treated felt had an enhanced tensile strength of 50 kg/30 mm.

Comparative Example 4

The same procedures as in Example 5 were carried out except that the activated porous carbon fiber felt was replaced by a non-porous carbon fiber felt, having a basis weight of 120 g/m², a thickness of 0.5 mm, a width of 30 mm and a length of 30 mm. The non-porous carbon fiber felt was produced from non-porous carbon fibers having a specific surface area of 0.2 m²/g and a thickness of 10 μm and produced by heat-treating phenol resin fibers having a thickness of 15 μm in air at a temperature of 200° C. for 10 minutes; and carbonizing the heat treated fibers in an inert gas consisting of nitrogen at a temperature of 900° C. for 10 minutes. As a result of the above-mentioned analysis, it was found that the resultant fiber felt contained a small amount of silicon carbide. However, when the resultant felt was heat treated in air at a temperature of 1,000° C. for one hour, a weight reduction of 97% occurred and the original form of the felt disappeared.

Comparative Example 5

The same procedures as in Example 5 were carried out with the following exceptions. The silicon monoxide particles were replaced by silicon particles. After the materials were placed in the core tube in the heating furnace, the inside pressure of the furnace was reduced to 1 Pa and the temperature of the furnace was raised up to 1,000° C. at a rate of 1,000° C./hr and then up to 1,400° C. at a rate of 400° C./hr. In the furnace, the firing of the materials was carried out at 1,400° C. for 2 hours and then the furnace was naturally cooled to room temperature at a rate of 300° C./hr. The resultant fired felt surface appeared bluish grey in color and thus it was assumed that a certain type of reaction occurred on the surface of the carbon fiber felt. However, it was found that the core portions of the fired fibers were still black in color and thus the reaction did not occur in the core portions.

As a result of the analysis, it was confirmed that the fired carbon fiber felt contained a small amount of silicon carbide. When heat treated in air at a temperature of 1,000° C. for one hour, a weight reduction of the felt was 99% and the original form of the felt disappeared.

From the above-mentioned Examples 5 to 7, it was confirmed that a dense silicon carbide fiber felt can be produced without employing a binder for the fibers.

We claim:

1. A method of producing silicon carbide fibers comprising the steps of:

producing activated porous carbon fibers by heat-treating organic fibers selected from the group consisting of cellulose fibers, polyacrylonitrile fibers, petroleum pitch fibers, polyimide fibers and phenol resin fibers, in an oxidative gas atmosphere, carbonizing the heat-treated organic fibers in an inert gas, and activating the resultant carbon fibers with an activating gas, to convert the carbon fibers to activated porous carbon fibers having a specific surface area of 100 to 3,000 m²/g, a length of 5 mm or more and a thickness of from 5 to 100 μm; and bringing the activated porous carbon fibers into contact with a silicon monoxide gas at a temperature of from 800° C. to 2,000° C. under a reduced pressure of $10^2$ Pa or less, to allow the silicon monoxide gas to penetrate into the pores of the activated porous carbon fiber and to react with the peripheral and internal wall surfaces of the carbon fibers so as to completely silicify into silicon carbide fibers having a length of 5 mm or more, without generating silicon carbide whiskers.

2. The method as claimed in claim 1, wherein the heat treatment of the organic fibers are carried out at a temperature of from 200° C. to 400° C., the carbonization of the heat-treated organic fibers is carried out at a temperature of 450° C. to 1,000° C. and the activation of the carbon fibers is carried out at a temperature of 800° C. to 1,200° C.

3. The method as claimed in claim 1, wherein the silicon monoxide gas is one produced by heating a member selected from the group consisting of silicon monoxide particles, silicon dioxide particles, mixtures of silicon particles with silicon monoxide particles, and a mixture of silicon particles with silicon dioxide particles, at a temperature of 500° C. or more under a reduced pressure of from $10^{-6}$ to 1,000 Pa.

4. The method as claimed in claim 1, wherein the resultant silicon carbide fibers are further heat treated at a temperature of from 800° C. to 2,000° C. in a gas atmosphere containing an oxidative gas.

5. The method as claimed in claim 4, wherein the oxidative gas-containing gas comprises at least 1 ppm of oxygen or a gas capable of generating oxygen upon being heated, and the balance consisting of at least one inert gas.

6. The method as claimed in claim 4, wherein the oxidative gas-containing gas atmosphere consists of oxygen gas alone in an amount, in terms of pressure, of $10^{-3}$ Pa or more.

7. The method as claimed in claim 1, wherein the activated porous carbon fibers are formed into a sheet, and then subjected to the reaction with silicon monoxide, to produce a silicon carbide fiber sheet.

8. The method as claimed in claim 7, wherein the resultant silicon carbide fiber sheet is further heat-treated at a temperature of from 800° C. to 2,000° C. in a gas atmosphere containing an oxidative gas.

9. The method as claimed in claim 8, wherein the oxidative gas-containing gas atmosphere consists of oxygen gas alone in an amount, in terms of pressure, of $10^{-3}$ Pa or more.

* * * * *